US006719478B2

(12) United States Patent
Gregel et al.

(10) Patent No.: US 6,719,478 B2
(45) Date of Patent: Apr. 13, 2004

(54) REINFORCING BAR CONNECTION AND METHOD

(75) Inventors: John J. Gregel, Bedford, OH (US); Louis J. Colarusso, Macedonia, OH (US)

(73) Assignee: Erico International Corporation, Solon, OH (US)

( * ) Notice: Subject to any disclaimer, the term of this patent is extended or adjusted under 35 U.S.C. 154(b) by 5 days.

(21) Appl. No.: 10/055,551

(22) Filed: Jan. 23, 2002

(65) Prior Publication Data

US 2002/0110413 A1 Aug. 15, 2002

Related U.S. Application Data

(60) Provisional application No. 60/263,860, filed on Jan. 23, 2001.

(51) Int. Cl.[7] .................................................. F16B 2/02

(52) U.S. Cl. ....................... 403/310; 403/309; 403/300; 403/311

(58) Field of Search ................................ 403/300, 301, 403/302, 309, 310, 311, 307, 305

(56) References Cited

U.S. PATENT DOCUMENTS

| | | | | |
|---|---|---|---|---|
| 50,190 A | | 9/1865 | Watson | |
| 1,377,101 A | | 5/1921 | Sparling | |
| 3,480,309 A | | 11/1969 | Harris | |
| 3,551,999 A | | 1/1971 | Gutmann | |
| 3,769,678 A | | 11/1973 | Marsden | |
| 3,891,294 A | * | 6/1975 | Philibert | 439/462 |
| 3,969,920 A | | 7/1976 | Marsden et al. | |
| 4,241,490 A | | 12/1980 | Edwards | |
| 4,408,926 A | | 10/1983 | Werner | |
| 4,469,465 A | | 9/1984 | Andrus | |
| 4,710,052 A | | 12/1987 | Elger | |
| 4,848,971 A | | 7/1989 | Price Jr. | |
| 4,850,777 A | | 7/1989 | Lawrence et al. | |
| 5,308,184 A | | 5/1994 | Bernard | |
| 6,089,779 A | * | 7/2000 | Lancelot, III | 403/313 |
| 6,099,196 A | | 8/2000 | Lancelot, III | |

FOREIGN PATENT DOCUMENTS

| | | |
|---|---|---|
| DE | 1659247 | 2/1971 |
| FR | 2558904 A1 | 1/1984 |
| GB | 974442 | 11/1964 |
| GB | 1432888 | 4/1976 |
| WO | 93/24257 | 12/1993 |
| WO | 00/66852 | 11/2000 |

OTHER PUBLICATIONS

CCL Systems Limited, "*CCL Alpha Splice*".
Blitz Corporation, PM Blitz Coupler, "*Blitz Splice the Ultimate Rebar Connection*".
Stricon Products Ltd., "*The Stricon Ultimate Stress Splicer*".
Concrete Reinforcing Steel Institute Pamphlet entitled, "*Reinforcement Anchorages and Splices*", 4th ed. (1997).
Quick Wedge, Manufactured by ERICO®, Inc. (1992).

* cited by examiner

*Primary Examiner*—John R. Cottingham
(74) *Attorney, Agent, or Firm*—Renner, Otto, Boisselle & Sklar, LLP

(57) ABSTRACT

A high strength reinforcing bar splice uses a contractible jaw assembly bridging the bar ends to be joined. The jaw assembly includes interior teeth designed to bite into the projecting ribs or deformations on the outside of the bar ends which form the overall diameter of the bar but not the core or nominal diameter of the bar. The jaw assembly is constricted from both axial ends by driving tapered locking collars on each end of the jaw assembly with a tool while concurrently causing the jaw assembly to constrict and bite into the bar ends. When the tool is removed, the collars remain in place locking the jaw assembly closed. The splice provides not only high tensile and compressive strengths but also has good fatigue and dynamic strength to qualify as a Type 2 coupler.

12 Claims, 4 Drawing Sheets

REINFORCING BAR CONNECTION AND METHOD

This application claims priority from U.S. Provisional Application No. 60/263,860, titled "Reinforcing Bar Connection and Method," filed Jan. 23, 2001.

TECHNICAL FIELD

This invention relates generally as indicated to a reinforcing bar connection, and more particularly to a high strength reinforcing bar splice which provides not only high tensile and compressive strengths, but also has the dynamic and fatigue characteristics to qualify as a Type 2 coupler approved for all United States earthquake zones. The invention also relates to a method of making the connection.

BACKGROUND OF THE INVENTION

In steel reinforced concrete construction, there are generally three types of splices or connections; namely lap splices; mechanical splices; and welding. Probably the most common is the lap splice where two bar ends are lapped side-by-side and wire tied together. The bar ends are of course axially offset which creates design problems, and eccentric loading whether compressive or tensile from bar-to-bar. Welding is suitable for some bar steels but not for others and the heat may actually weaken some bars. Done correctly, it requires great skill and is expensive. Mechanical splices normally require a bar end preparation or treatment such as threading, upsetting or both. They also may require careful torquing. Such mechanical splices don't necessarily have high compressive and tensile strength, nor can they necessarily qualify as a Type 2 mechanical connection where a minimum of five couplers must pass the cyclic testing procedure to qualify as a Type 2 splice in all United States earthquake zones.

Accordingly, it would be desirable to have a high strength coupler which will qualify as a Type 2 coupler and yet which is easy to assemble and join in the field and which does not require bar end preparation or torquing in the assembly process. It would also be desirable to have a coupler which could be assembled initially simply by sticking a bar end in an end of a coupler sleeve or by placing a coupler sleeve on a bar end.

SUMMARY OF THE INVENTION

A reinforcing bar connection for concrete construction utilizes a contractible jaw or assembly which is closed around aligned bar ends to form the joint and tightly grip the bars. The jaw assembly is closed from each axial end to constrict around and bridge the ends of end-to-end reinforcing bars. The jaws of the assembly have teeth which bite into the ends of the bar. The assembly is constricted by forcing self-locking taper sleeves or collars over each end which hold the jaw constricted locking the bars together. The teeth are designed to bite into the ribs or projecting deformations on the surface of the bar which forms the overall diameter, but not bite into the core or nominal diameter of the bar. In this manner, the splice does not affect the fatigue or ultimate strength properties of the bar while providing a low slip connection. The jaw segments may be held assembled by a frangible plastic frame. The configuration of the jaws limits the contraction and precludes undue penetration of the bar by the teeth. The connection or splice has high tensile and compressive strength and will pass the dynamic cycling and/or fatigue requirements to qualify as a Type 2 coupler. No bar end preparation or torque application is required to make the coupling. In the method, the closing and locking occur concurrently with a simplified tool to enable the splice to be formed easily and quickly.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Figure 1:
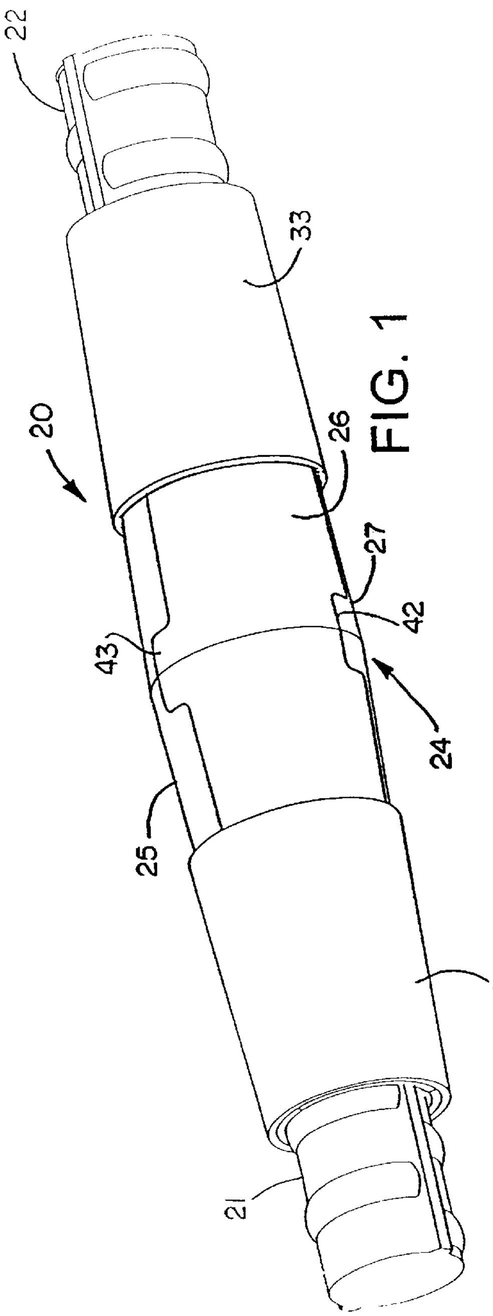
FIG. 1 is a perspective view of a completed or assembled splice in accordance with the invention.
Figure 2:
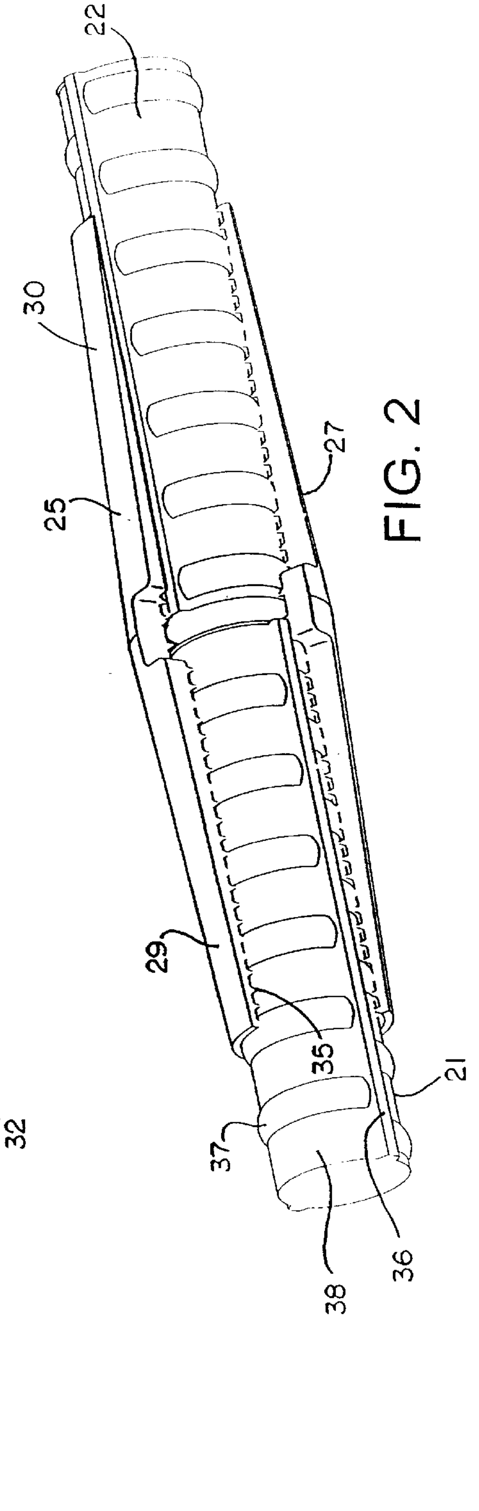
FIG. 2 is a similar view with the locking collars and one jaw of the assembled splice removed.
Figure 3:
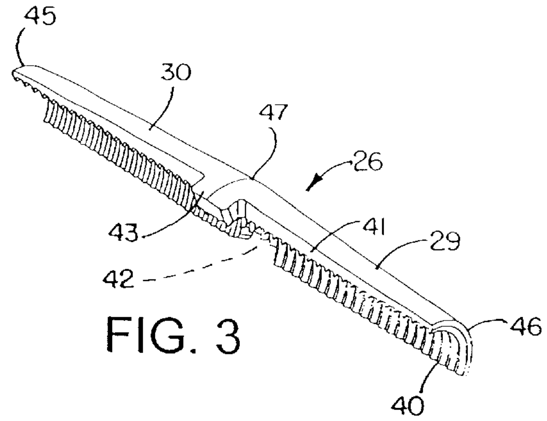
FIG. 3 is a perspective view of one of the jaws.

Referring initially to FIGS. 1 and 2, there is illustrated a reinforcing bar connection in accordance with the present invention shown generally at 20 joining end-to-end axially aligned deformed reinforcing bars 21 and 22. The reinforcing bars are shown broken away so that only the ends gripped by the splice or connection are illustrated. It will be appreciated that the bars may extend to a substantial length and may either be vertical, horizontal, or even diagonal in the steel reinforced concrete construction taking place. The connection and bars are designed to be embedded in poured concrete. The connection comprises a jaw assembly shown generally at 24, which includes three circumferentially interfitting three jaw elements shown at 25, 26 and 27. It will be appreciated that alternatively two jaw elements or more than three jaw elements may form the assembly 24.

As seen more clearly in FIG. 2, the exterior of the jaw elements forms oppositely tapering shallow angle surfaces seen at 29 and 30, on which are axially driven matching taper lock collars 32 and 33, respectively. When the lock collars 32 and 33 are driven toward each other, the jaw assembly 24 contacts driving the interior teeth shown at 35 on each jaw element into the deformed, or projecting portions, of the bar such as the longitudinal projecting ribs 36 and the circumferential ribs 37. The projecting rib formation on the exterior of the bars may vary widely, but most deformed bars have either a pattern like that shown or one similar to such pattern. The teeth 35 are designed to bite into such radial projections on the bar, but not into the core 38, which forms the nominal diameter of the bar. It should be again noted that in FIG. 2, the jaw element 26 has been removed as well as the lock collars 32 and 33 to illustrate the interior teeth 35.

Referring now to FIGS. 3 through 7, there is illustrated a single jaw 26. Each of the three jaws forming the jaw assembly 24 are identical in form. Each jaw is a one-piece construction and is preferably formed of forged steel heat treated and stress relieved.

Figure 5:
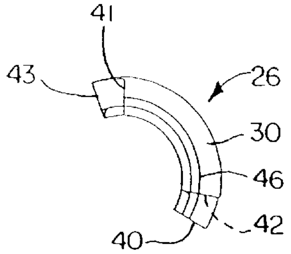
FIG. 5 is an axial end elevation of the jaw as seen from the right hand end of FIG. 4.

As seen more clearly in FIG. 5, since three jaw elements form the jaw assembly, each jaw element extends on an arc of approximately 120°. As seen more clearly in FIGS. 3 and 5, the 120° extends from one axial, or longitudinal, edge 40 to the other seen at 41 Such edges or seams between the jaw elements are axially parallel and uninterrupted except for the circumferential recesses 42 in the longitudinal edge 40 and the interfitting projection 43 on the longitudinal edge 41. Each projection 43 is designed to fit into the notch 42 of the circumferentially adjacent jaw element. The interfitting projections and notches ensure that the jaw elements do not become axially misaligned as the connection is formed. The interfitting circumferential projections and notches also ensure that the jaw assembly remains an assembly as the splice is formed. The interfit of the circumferential projections with the notches of adjacent jaw elements is seen more clearly in FIG. 1. The interfitting projections and notches may extend approximately 20° into or beyond the longitudinal seams.

Figure 4:
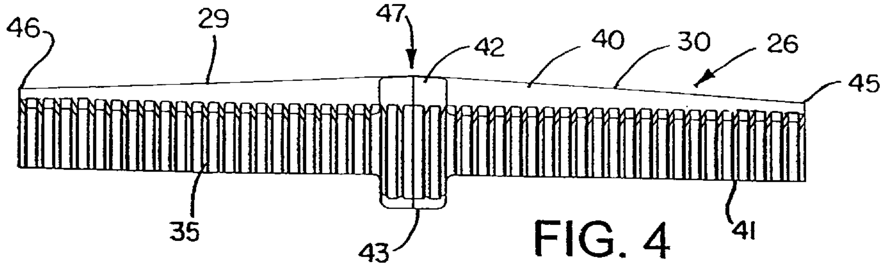
FIG. 4 is a bottom elevation of the jaw of FIG. 3.
Figure 6:
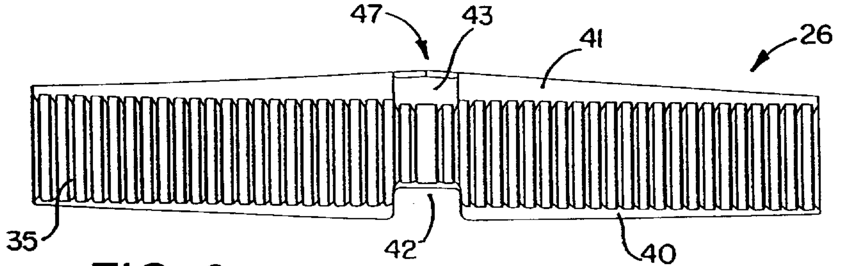
FIG. 6 is a plan view elevation of the jaw as seen from the left hand side of FIG. 5.

As seen more clearly in FIGS. 4 and 6, each jaw element tapers from its thinnest wall section at the opposite ends 45 and 46 to its thickest wall section shown in the middle at 47. The taper surfaces formed by the exterior of the jaw elements are low angle, self-locking tapers of but a few degrees and, of course, the tapers match the interior taper of the taper collars 32 and 33 which are driven axially on the end of the splice. The taper is preferably a low angle taper on the order from about one to about five degrees.

The taper exterior of the opposite ends of the jaw elements as well as the jaw assembly not only enables the matching lock collars to be driven on the splice, contracting the jaw elements with great force but locking them in contracted position. The configuration of the connection also enhances the dynamic and fatigue characteristics of the splice. This not only enhances the fatigue characteristics of the splice, but also enables the splice to qualify as a Type 2 coupler which may be used anywhere in a structure in any of the four earthquake zones of the U.S.

Figure 7:
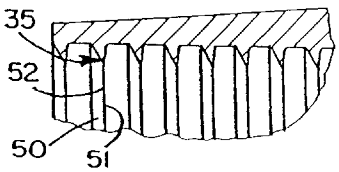
FIG. 7 is an enlarged axial section of a preferred jaw tooth profile.

Referring now to FIG. 7, it will be seen that the interior of each jaw element is provided with a series of relatively sharp teeth 35, which in the illustrated embodiment are shown as annular. However, it will be appreciated that a thread form of tooth may be employed. Each tooth 35 includes a sloping flank 50 on the side of the tooth toward the end of the jaw element. However, toward the middle of the jaw element, the tooth has an almost right angular flank 51 which meets flank 50 at the relatively sharp crown 52. The flank 50 may be approximately 60° with respect to the axis of the jaw element while the flank 51 that is almost 90°. It will be appreciated that the teeth 35 may alternatively have other suitable configurations.

As seen in comparing the left and right hand side of FIG. 6, the teeth on the opposite end are again arranged with the angled flank on the exterior while the sharper almost perpendicular flank faces the mid-point 47 of the jaw element.

As indicated, the inward projection of the teeth is designed to bite into the projecting deformations on the bar, but not into the core 38. As the teeth 35 press into the deformation, they provide additional cold working of the bar, resulting in better performance of the connection. By not pressing the teeth 35 into the core 38 of the bar, fatigue cracks and/or stress concentrations may thereby be avoided.

Figure 8:
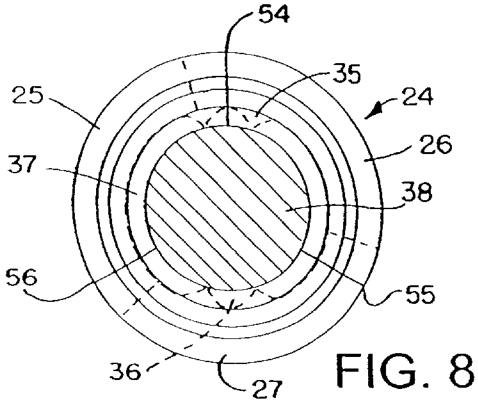
FIG. 8 is an axial end elevation with the bar in section of the jaw assembly contracted and gripping the bar ends.

The three jaw elements are shown in FIG. 8 closed with the teeth 35 of the jaw elements biting into the bar deformation projections 36 and 37, but not into the bar core 38. When closed, the three longitudinal seams between the jaw elements seen at 54, 55 and 56 will be substantially closed preventing further contraction of the jaw assembly keeping the teeth from biting into the core. The total contraction of the splice is controlled both by the circumferential dimensions and the axial extent to which the lock collars are driven on each end of the splice.

It will be appreciated that a transition splice may be formed with the present invention simply by reducing the interior diameter of one end of the splice so that the teeth on that end will bite into the projecting deformations on a smaller bar. The exterior configuration of the jaw elements may also change or remain the same with different size or identical locking collars driven on each end.

It will be appreciated that alternatively other means may be utilized for contracting internally-toothed jaw elements to clamp ends of reinforcing bars, for example by use of a radially-contracting collar or band.

Figure 10:
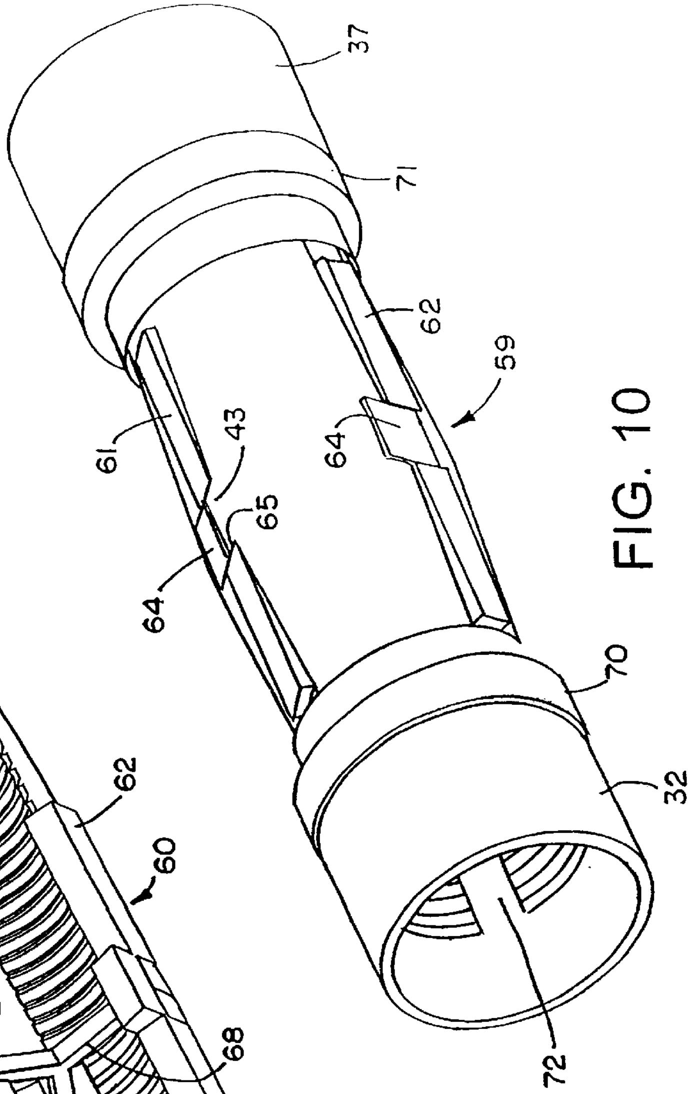
FIG. 10 is a similar perspective view of the splice assembly with the jaws open and locking collars assembled but not in locking positions.
Figure 9:
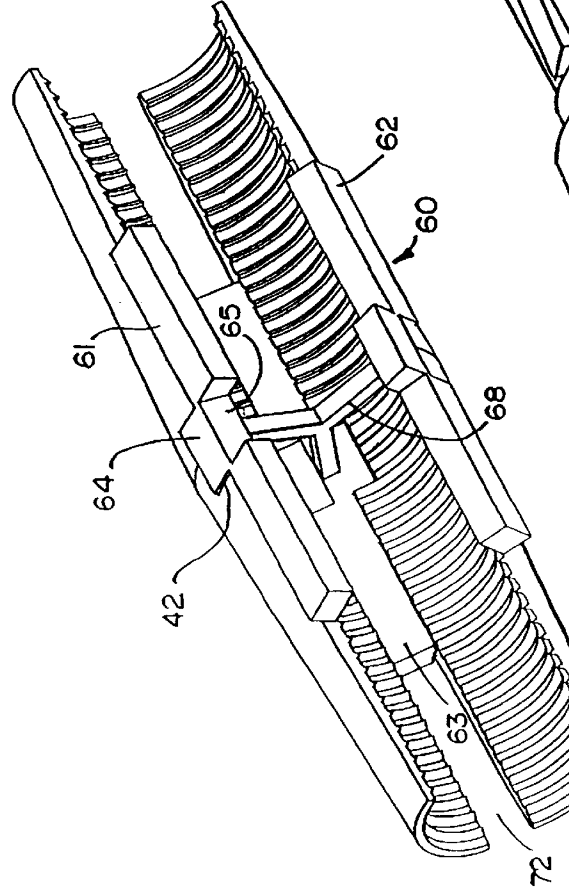
FIG. 9 is a perspective of a plastic spacer for assembling the jaw elements with one jaw removed for clarity of illustration.

Referring now to FIGS. 9 and 10, there is illustrated a splice assembly 59 where the jaw elements are held open and spaced from each other by a plastic spacer shown generally at 60. The plastic spacer comprises three generally axial or longitudinal elements seen at 61, 62 and 63, each of which includes a center lateral projection 64 and an opposite notch 65. The projection 64 snugly fits into the notch 42 of the jaw element while the notch 65 receives the projection 43 of the adjacent jaw element in a snug fit.

The three axially extending or longitudinal elements are held in place with respect to each other by the center three-legged triangular connection shown generally at 68, which also acts as a bar end stop. In this manner, the three jaw elements are held assembled and circumferentially spaced. Each locking collar may be positioned on the end of the assembled jaw elements as seen at 32 and 33 and held in place by a shrink wrap, for example, as seen at 70 and 71, in FIG. 10, respectively. In this manner, the jaw elements are held circumferentially spaced as seen by the gaps 72. The assembly seen in FIG. 10 may readily be slipped over the end of a reinforcing bar and the end of the bar will be positioned in the middle of the splice by contact of the bar end with the triangular leg center connection 68. When the opposite bar end is inserted into the open and assembled splice, the jaw assembly may then be closed by driving the two lock collars 32 and 33 axially toward each other. The force of driving on the lock collars will disintegrate not only the shrink wrap 70 and 71, but also the support 60 which is made preferably of a frangible or friable plastic material. This then permits the jaw assembly to close to the extent required to bite into the radial bar projections to form a proper high fatigue strength coupling joining the two bar ends.

Figure 11:
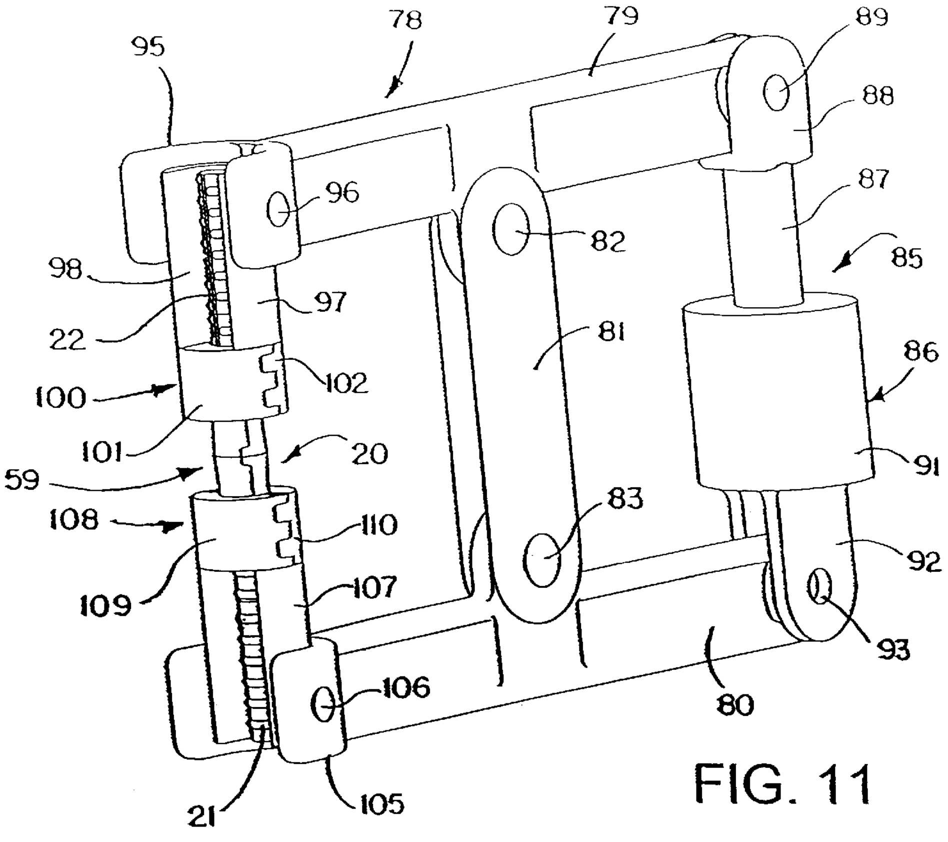
FIG. 11 is a perspective view of an installation tool for closing the jaw assembly from each axial end while placing locking collars on both axial ends.

Referring now to FIG. 11, there is illustrated a tool shown generally at 78 for completing the splice or connection of the present invention. Although the tool is shown connecting the bars 21 and 22 vertically oriented, it will be appreciated that the bars and splice may be horizontally or even diagonally oriented. The tool is preferably made of high strength aluminum members to reduce its weight and includes generally parallel levers 79 and 80 connected by center link 81 pivoted to the approximate mid-point of such levers as indicated at 82 and 83. Connecting the outer or right hand end of the levers 79 and 80 is an adjustable link shown generally at 85 in the form of a piston-cylinder assembly actuator 86. The adjustable link may also be a turnbuckle or air motor, for example. The rod 87 of the assembly is provided with a clevis 88 pivoted at 89 to the outer end of lever 79. The cylinder of the assembly 91 is provided with a mounting bracket or clevis 92 pivoted at 93 to the outer end of lever 80.

The opposite end of the lever 79 is provided with a C-shape termination pivoted at 96 to a C-shape tubular member 97 having an open side 98. A wedge driving collar shown generally at 100 is mounted on the lower end of the open tube 97. The collar is formed of hinged semi-circular halves 101 and 102. When closed and locked, the wedge collar has an interior taper matching that of the taper collars 32 or 33.

The lower arm 80 similarly is provided with a C-termination 105 pivoted at 106 to open tube 107 supporting wedge collar 108 formed of pivotally connected semi-circular halves 109 and 110.

In order to make a splice, the coupler or splice assembly 59 seen more clearly in FIG. 10 is aligned with a first bar 21, for example. The coupler assembly is then slid onto the bar end. A second bar 22 is then positioned in line with a coupler and the second bar is slid into position such that the coupler is centered between both bars. The bar ends will contact the triangular spider connection in the center of the bar splice assembly to ensure that the bar ends are properly seated with respect to the coupler assembly. The tool with the wedge collars 100 or 108 open is then positioned over the bars. The wedge collars are closed and the actuator, or piston cylinder assembly 86, is extended to drive the wedge collars toward each other, driving the taper lock collars 32 and 33 on the jaw assembly to the position seen in FIG. 1, forming the splice 20. The wedge collars 100 and 108 are then opened and the tool removed. The taper lock collars 32 and 33 remain in place. When the taper lock collars are driven on the ends of the splice or connection, the jaw elements contract and the teeth on the interior bite into the projecting deformations on the bar ends, but do not bite into the core diameter of the bar.

It will be seen that the present invention provides a high strength coupler or splice which will qualify as a Type 2 coupler and yet which is easy to assemble and join in the field and which does not require bar end preparation or torquing in the assembly process.

Although the invention has been shown and described with respect to certain preferred embodiments, it is obvious that equivalent alterations and modifications will occur to others skilled in the art upon the reading and understanding of this specification. It will be appreciated that suitable features in one of the embodiments may be incorporated in another of the embodiments, if desired. The present invention includes all such equivalent alterations and modifications, and is limited only be the scope of the claims.

What is claimed is:

1. A reinforcing bar splice comprising:

a contractible jaw assembly adapted to bridge the ends of generally axially aligned reinforcing bars for reinforced concrete;

means to close the jaw assembly from both axial ends of the jaw assembly to cause the assembly to contract and grip the bar ends; and means to lock the jaw assembly in contracted gripping condition;

wherein said jaw assembly has tapered ends and said contraction is by an axial force on said tapered ends;

wherein said means to lock the jaw assembly contracted comprises a tapered collar on each axial tapered end;

wherein the taper of said jaw assembly ends and said collars is a low angle self-locking taper;

wherein said jaw assembly comprises a plurality of jaw elements circumferentially separated before contraction with a slight axial gap between the jaw elements; and including a circumferential projection on one jaw element fitting in a corresponding recess in an adjacent jaw element to hold the jaw elements axially aligned.

2. A reinforcing bar splice as set forth in claim 1 including at least three jaw elements forming the jaw assembly, each including a circumferential projection and a recess.

3. A reinforcing bar splice as set forth in claim 2 including spacer means to hold the jaw elements assembled, and elastic stop means to set the position of the ends of the aligned reinforcing bars with respect to the jaw assembly.

4. A reinforcing bar splice comprising:

a pair of generally axially aligned reinforcing bar ends, each of the bar ends including a core and projections projecting outward from the core;

at least two contractible jaw elements configured to engage the bar ends, wherein the jaw elements each have a wall with tapered outer surfaces sloping up from both jaw element ends of the jaw element, and wherein the jaw elements have teeth along an inner surface of the wall; and tapered collars engaging the tapered outer surfaces of the jaw elements to force the jaw elements inward to grip the bar ends;

wherein the teeth bite into the projections but not into the core.

5. The splice of claim 4, wherein the teeth are asymmetric teeth;

wherein each of the teeth includes an inner flank and an outer flank, wherein the inner flank is closer to a middle of the jaw element than the outer flank; and wherein the flanks have respective slopes of different magnitudes relative to the wall.

6. The splice of claim 5, wherein the magnitude of the slope of the inner flank slope is greater than the magnitude of the slope of the outer flank.

7. The splice of claim 5, wherein the inner flank is substantially at a right angle relative to the wall.

8. The splice of claim 4, wherein the tapered outer surfaces have a taper of from about one degree to about five degrees.

9. The splice of claim 4, wherein the bars are deformed bars.

10. The splice of claim 4, wherein the splice includes at least three jaw elements.

11. The splice of claim 10, wherein longitudinal seams between the jaw elements are substantially closed.

12. The splice of claim 4, including a circumferential projection on one jaw element fitting in a corresponding recess in an adjacent jaw element to hold the jaw elements axially aligned.

* * * * *